United States Patent
Fasske

[19]

[11] Patent Number: 6,116,131
[45] Date of Patent: Sep. 12, 2000

[54] APPARATUS FOR SHEARING MULTI-WALLED WORKPIECES

[75] Inventor: Wayne C. Fasske, Southington, Conn.

[73] Assignee: Shear, L.L.C., Hartford, Conn.

[21] Appl. No.: 08/996,938

[22] Filed: Dec. 23, 1997

Related U.S. Application Data

[63] Continuation-in-part of application No. 08/777,939, Dec. 23, 1996, Pat. No. 5,943,930.

[51] Int. Cl.⁷ .................................................. B26D 7/02
[52] U.S. Cl. ............................. 83/456; 83/453; 83/465; 83/468.7
[58] Field of Search ............................. 83/456, 453, 465, 83/468.7

[56] References Cited

U.S. PATENT DOCUMENTS

| | | | |
|---|---|---|---|
| 53,416 | 3/1866 | Cole . | |
| 175,182 | 3/1876 | Slusser et al. . | |
| 257,286 | 5/1882 | Bruce . | |
| 284,496 | 9/1883 | Seymour . | |
| 606,261 | 6/1898 | Yates | 83/468.7 |
| 1,884,001 | 10/1932 | Lewis | 83/456 |
| 3,851,557 | 12/1974 | Vierstraete | 83/456 |
| 3,877,690 | 4/1975 | Owens | 83/456 |
| 3,895,551 | 7/1975 | Goransson | 83/456 |
| 3,938,413 | 2/1976 | Goettel et al. | 83/145 |
| 3,956,952 | 5/1976 | Goettel et al. | 83/145 |
| 4,218,946 | 8/1980 | Witzler | 83/636 |
| 4,337,680 | 7/1982 | Borzym | 83/456 |
| 4,338,839 | 7/1982 | Farrell, Sr. et al. | 83/620 |
| 4,338,840 | 7/1982 | Farrell, Sr. et al. | 83/622 |
| 4,437,374 | 3/1984 | Borzym | 83/456 |
| 4,659,029 | 4/1987 | Rodriguez | 242/56 |
| 4,831,910 | 5/1989 | Poulsen | 83/693 |
| 4,846,029 | 7/1989 | Gardner | 83/456 |
| 4,848,723 | 7/1989 | Borzym | 83/456 |
| 4,872,384 | 10/1989 | Borzym | 83/456 |
| 5,090,285 | 2/1992 | Kondô | 83/636 |
| 5,105,703 | 4/1992 | Kondô | 83/636 |
| 5,125,306 | 6/1992 | Borzym | 83/456 |
| 5,161,444 | 11/1992 | Kusakabe et al. | 83/456 |
| 5,463,920 | 11/1995 | Korb | 83/56 |

FOREIGN PATENT DOCUMENTS

| | | | |
|---|---|---|---|
| 199416 | 6/1908 | Germany . | |
| 2 126 938 | 4/1984 | United Kingdom | B23D 17/00 |

*Primary Examiner*—M. Rachuba
*Assistant Examiner*—Sean Pryor
*Attorney, Agent, or Firm*—Cummings & Lockwood

[57] ABSTRACT

In an apparatus for shearing multi-walled workpieces, such as metal framing studs, a base support defines a blade gap therebetween, and a guillotine-like blade is slidably received within the gap for shearing the workpieces. A pair of first supports are each slidably mounted on a respective base support. A pair of second supports are also each slidably mounted on the base support, and are spaced apart from and face the first supports to thereby define an adjustable-width channel therebetween. Each of the supports defines a blade-like edge for engaging an elongated, multi-walled workpiece, such as a framing stud, which is received within the channel, and the first and second support surfaces are each moved into contact with a respective wall of the workpiece to support the workpiece. The supports can be oriented relative to one another such that the axis of the channel, and a longitudinal axis of the workpiece received within the channel can be oriented at a desired angle relative to the blade. The guillotine-like blade is then driven downwardly into engagement with the workpiece, and the V-shaped cutting edge of the blade cooperates with the blade-like edges of the supports to shear the workpiece along a line of contact.

21 Claims, 6 Drawing Sheets

APPARATUS FOR SHEARING MULTI-WALLED WORKPIECES

CROSS REFERENCE TO RELATED APPLICATION

This patent application is a continuation-in-part of U.S. patent application Ser. No. 08/777,939 filed Dec. 23, 1996 now U.S. Pat. No. 5,943,930 entitled "APPARATUS FOR SHEARING MULTI-WALLED WORKPIECES", filed on Dec. 23, 1996, and co-pending herewith now U.S. Pat. No. 5,943,930.

FIELD OF THE INVENTION

The present invention relates to apparatus for cutting sheet-like material, and more particularly, to apparatus for shearing workpieces of different sizes and shapes having at least two walls formed of sheet-like material, such as metal framing studs and eavestroughs.

BACKGROUND INFORMATION

Metal framing studs are used in the building industry, and particularly the commercial building industry, for constructing framework and mounting thereto wallboards formed of sheet rock and other types of materials. Although framing studs may be formed in a variety of different shapes and configurations, a common type of stud is formed of metal, and defines a back wall and two parallel side walls forming a generally U-shaped cross section. Commercially-available studs are supplied in standard lengths, and therefore if a non-standard length is required, a standard stud must be trimmed, frequently by the builder, to the desired length.

Stud trimming is often performed at job sites by employing a chop saw having an abrasive wheel, disk or like rotatably-driven blade, which is pivotally mounted on a base for movement into and out of engagement with a workpiece. The chop saw blades can wear relatively quickly, particularly when used to cut heavy-gauge workpieces. In addition, because of limitations in blade size, many chop saws cannot cut through relatively large-width studs with a single cutting stroke, but rather require the stud to be flipped over after cutting through one side, and then cut again in order to cut through its entire width. Use of a chop saw to trim framing studs or like workpieces can therefore be a relatively time-consuming, labor-intensive and expensive operation, particularly at large job sites or jobs otherwise requiring a large number of studs or like workpieces to be trimmed.

Manufacturers of framing studs, eavestroughs or like workpieces have employed machines for shearing such workpieces to their desired lengths at the time of manufacture. A typical such machine employs a guillotine-like cutting blade slidably received within a blade gap, and a pair of die plates mounted on opposite sides of the guillotine relative to each other for slidably receiving and supporting the workpiece during a cutting operation. Each die plate defines an aperture which is shaped to conform to the shape of a respective type and size of workpiece for conformably engaging the workpiece. A typical such apparatus is shown in U.S. Pat. No. 4,218,946 to Witzler, entitled "Cutter Assembly For Eavestrough-Forming Machine".

One of the drawbacks of these types of conventional shearing machines is that they cannot be conveniently employed for cutting a variety of different pre-manufactured studs, eavestroughs or like workpieces. Each die plate typically forms an aperture defining a fixed shape and dimension conforming to a manufacturer's particular type and size of workpiece, and therefore can only be used with the respective type of workpiece. In addition, framing studs and like workpieces frequently become bent or otherwise slightly deformed during transportation, thus preventing such workpieces from being received within their corresponding die plates. Accordingly, although such a machine could be used to cut a variety of framing studs or like workpieces by providing a variety of die plates having apertures of different shapes and configurations, this would not only be relatively expensive, but any slightly deformed workpieces could not be received within the die plates, and thus could not be cut by the machine.

Accordingly, it is an object of the present invention to overcome the drawbacks and disadvantages of the above-described machinery for cutting metal studs, eavestroughs or like multi-walled workpieces.

SUMMARY OF THE INVENTION

The present invention is directed to an apparatus for shearing workpieces having at least two sides formed of sheet-like material, such as framing studs or eavestroughs, comprising at least one first support defining a first support surface engageable with a first side of the workpiece, and at least one second support defining a second support surface engageable with a second side of the workpiece. Each second support surface is spaced apart from and faces a corresponding first support surface, and thereby defines a channel or like space between the first and second support surfaces for receiving the workpiece. At least one of the first and second support surfaces is movable relative to the other, and preferably all of the first and second support surfaces are movable relative to each other, for engaging with each support surface the respective sides of workpieces of different widths. A blade gap is formed adjacent to the first and second support surfaces, and a guillotine-like blade is slidably received within the blade gap and movable between a first position spaced away from the workpiece received within the channel, and a second position in engagement with the workpiece for shearing the workpiece along a line of contact.

In a preferred embodiment of the present invention, the apparatus includes two base supports spaced relative to each other and defining the blade gap therebetween; two first supports, each mounted on a respective base support and further defining the blade gap therebetween; and two second supports, each mounted on a respective base support and further defining the blade gap therebetween. The base supports also define a third support surface extending between the first and second support surfaces and engageable with a third side of the workpiece. Preferably, each base support defines an elongated groove having, for example, a dove-tail shape, and each of the first and second supports includes a corresponding mounting surface, such as a dove-tail flange received within the corresponding dove-tail groove, for permitting movement of the first and second supports relative to each other to thereby adjust the width of the channel to accommodate workpieces of different widths.

In another embodiment of the present invention, two pairs of supports are slidably mounted on the base support surfaces opposite to one another with the blade gap formed therebetween. Each support is independently movable relative to each of the other supports, such that a variable width channel can be formed between the pairs of supports and the axis of the channel can be oriented at any desired angle relative to the blade gap or a plane of the blade received within the gap.

In addition, each of the supports defines an upstanding blade-like edge for engaging the sides of a workpiece positioned in the channel. These blade-like edges support the workpiece along discreet lines of contact and thereby enable the workpiece to be positioned in the channel and oriented at any desired angle relative to the blade and blade gap. The blade can then cut the workpiece at the desired angle.

Preferably, each support in the first and second pairs of supports includes a first support member slidably engaged with the base support surface and a second support member coupled to the first support member and upstanding relative thereto. Each of the second support members includes first and second upstanding surfaces that intersect to define the respective blade-like edges.

Guide members are mounted to the underside of the supports, and are received within laterally-extending grooves formed in the base supports for slidably moving the supports relative to each other. Preferably, at least one fastener is connected between each guide member and the respective support for releasably engaging the guide members with the surfaces of the corresponding grooves to thereby adjust and fix the positions of the supports within the grooves.

One advantage of the apparatus of the present invention, is that it is adaptable to rapidly and effectively shear a variety of workpieces, such as framing studs, having different sizes, shapes and/or configurations.

Other objects and advantages of the present invention will become apparent in view of the following detailed description and accompanying drawings.

DETAILED DESCRIPTION OF THE PREFERRED EMBODIMENTS

Figure 1:
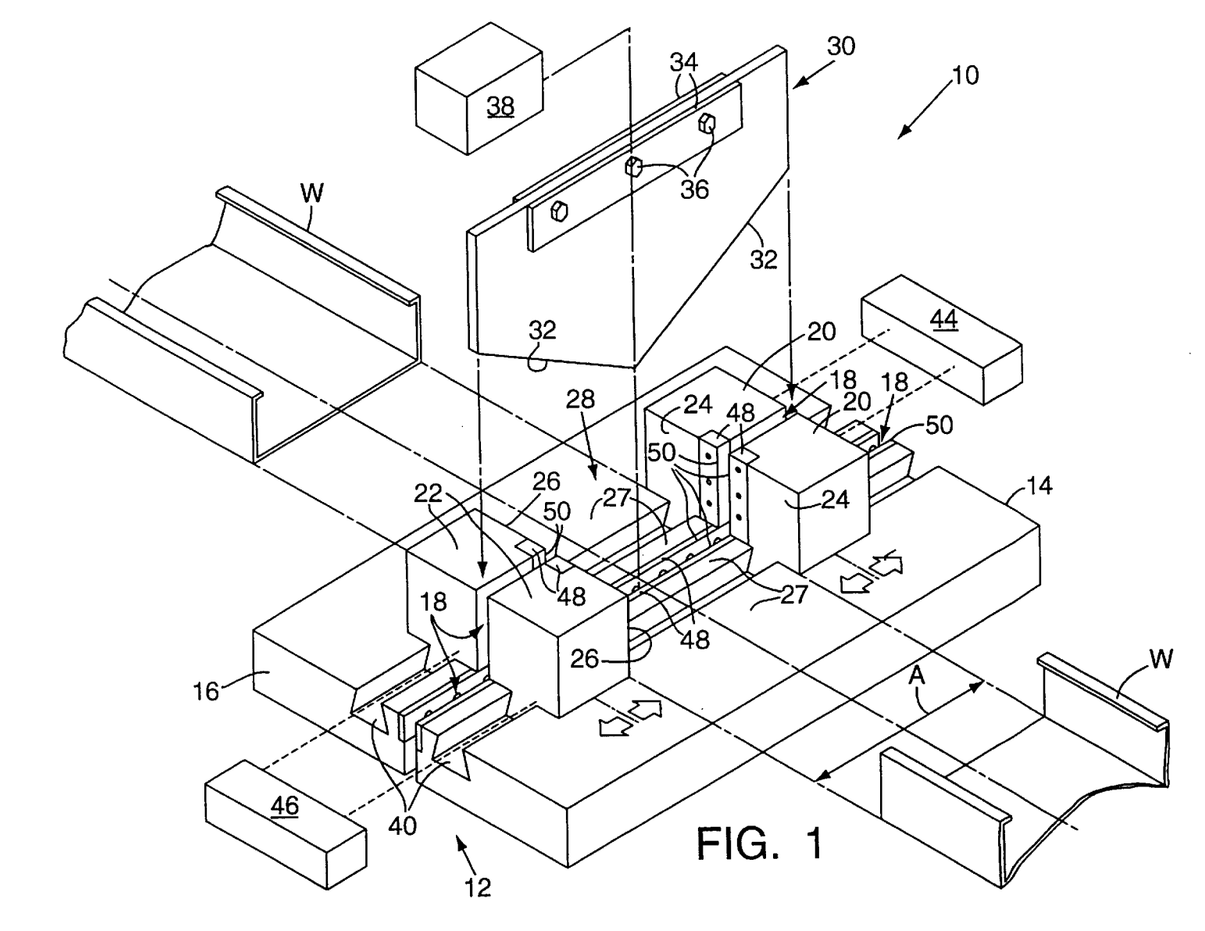
FIG. 1 is a partial schematic, perspective view of an apparatus embodying the present invention for cutting framing studs, or like multi-sided workpieces, of different widths and/or configurations.

In FIG. 1, an apparatus embodying the present invention is indicated generally by the reference numeral 10. The apparatus 10 comprises a base assembly 12 including a first base support 14, and a second base support 16 spaced apart from the first base support to define a blade gap 18 therebetween. A pair of first supports 20 are each movably mounted on one side of the first and second base supports 14 and 16, respectively, and a pair of second supports 22 are each movably mounted on the opposite sides of the first and second supports, respectively. Each first support 20 defines at least one first support surface 24 for engaging a first side of a workpiece "W", and each second support 22 defines at least one second support surface 26 for engaging a second side of the workpiece W. Each base support 14 and 16 similarly defines a third support surface 27 extending between the first and second support surfaces 24 and 26, respectively, for engaging and supporting a third side of the workpiece. As also shown in FIG. 1, the first support surfaces 24 are spaced apart from and face the second support surfaces 26, thus defining a channel 28 therebetween for receiving the workpiece W. In accordance with the present invention, at least one of the first and second support surfaces 24 and 26, respectively, is movable relative to the support surface on the opposite side of the channel 28 for adjusting the width "A" of the channel to thereby engage with each support surface the respective sides of workpieces of different widths.

As shown in FIG. 1, each first support 20 is mounted adjacent to the inner edge of the respective base section 14 or 16 so that the two first supports are closely spaced relative to each other to further define the blade gap 18 therebetween. Similarly, the two second supports 22 are each mounted adjacent to the inner edge of the respective base support, and are closely spaced relative to each other to further define the blade gap 18 therebetween.

A guillotine-like blade 30 is slidably received and retained within the blade gap 18 so that it is either in sliding contact with, or spaced immediately adjacent to the surfaces of the first, second and base supports forming the blade gap. As shown in FIG. 1, the blade 30 is approximately planar, and defines on its lower edge an elongated, approximately V-shaped cutting edge 32. A support flange 34 is fixedly secured to the upper edge of the blade 30 by suitable fasteners 36, and as shown schematically in FIG. 1, a suitable drive source 38 is coupled to the support flange 34 of the blade. As indicated by the arrows and described in further detail below, the drive source 38 is adapted to drive the blade 30 downwardly into engagement with a workpiece W received within the channel 28 to shear the workpiece, and to drive the blade upwardly within the channel during non-use so that it is spaced above either the third support surface 27 of the base, or a workpiece W seated on the third support surface. As will be recognized by those skilled in the pertinent art, the drive source 38 may take the form of any of numerous different drive sources that are currently or later become known to those of ordinary skill in the pertinent art, such as a lever and linkage assembly or like mechanical drive system, a hydraulic or pneumatic drive system employing one or more hydraulic or pneumatic cylinders coupled to the blade, or an electric motor coupled to the blade through a suitable drive train, such as a linkage assembly, belt drive or gear train (not shown).

In the preferred embodiment of the present invention, and as indicated by the arrows in FIG. 1, each of the first supports 20 and second supports 22 are movable laterally relative to the others and the third support surface 27 in order to adjust, for example, the width "A" of the channel 28 and thereby accommodate workpieces of different widths, and also to cut the workpiece "W" at a predetermined angle relative to its longitudinal or elongated axis. Accordingly, the apparatus 10 includes means for moving the supports laterally relative to each other, including moving one of the pairs of first and second supports relative to the other, including moving or for moving both pairs of first and second supports relative to each other. As shown typically in FIG. 2, each base support 14 and 16 defines an elongated mounting recess or groove 40 spaced adjacent to and extending approximately parallel to the blade gap 18. Each of the first and second supports 20 and 22, respectively, defines a corresponding mounting surface 42 or 42', respectively slidably received within the respective mounting recess for moving the respective support along the recess.

Figure 2:
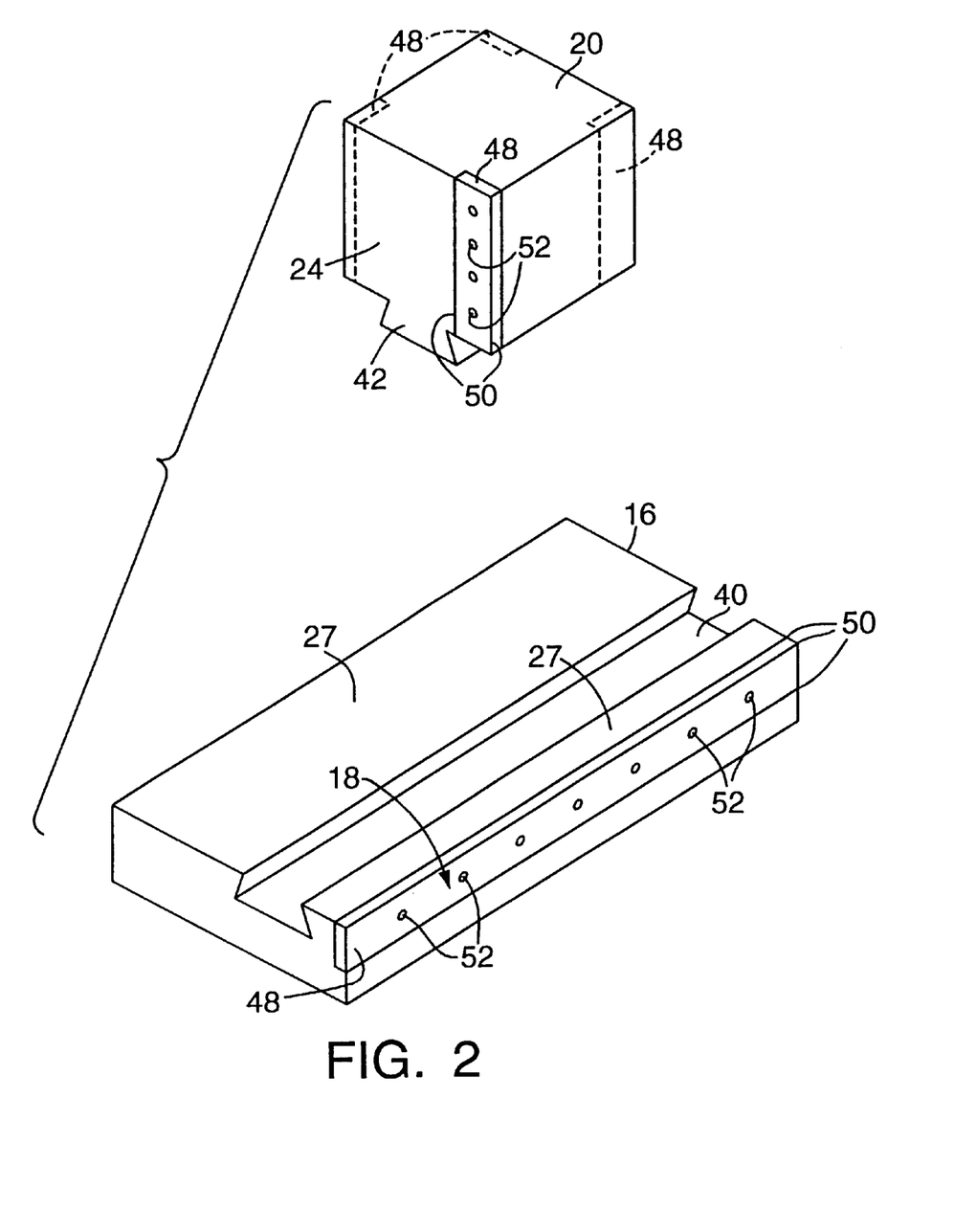
FIG. 2 is an exploded perspective view of a typical base and side support of the apparatus of FIG. 1.

As shown typically in FIG. 2, in the embodiment of the present invention illustrated, each mounting surface 42 and 42' is shaped in the form of a dove-tail flange projecting downwardly from the underside of the respective support, and extending along the width of the support. Similarly, the mounting recesses 40 are each correspondingly shaped in the form of a dove-tail groove for slidably receiving and retaining the dove-tail flanges 42 and 42'. As will be recognized by those skilled in the pertinent art, the illustrated means for moving the supports is only exemplary, and numerous other structures may equally be employed. For example, the mounting recesses and mounting surfaces or flanges of the supports may take any of numerous different shapes and/or configurations; alternatively, the recesses may be formed in the first and second supports, and the elongated flanges may in turn be formed by the base supports.

In the embodiment of the present invention illustrated, the first supports 20 and second supports 22 are solid, and formed of metal, such as steel, and are therefore substantially heavier than the typical workpiece W shown in FIG. 1. Accordingly, with this type of construction it may not be necessary to include means for fixedly securing the supports once moved into engagement with the respective sides of the workpiece. If necessary, however, a stop or like clamping mechanism (not shown) may be employed with each of the first and second supports for locking each support in place once moved within the respective groove into its desired position.

Alternatively, the apparatus 10 may further include means for driving either one pair of the first and second supports, or for driving both pairs of first and second supports. As shown schematically in FIG. 1, a first drive source 44 is coupled to the pair of first supports laterally 20 for moving the supports within the grooves 40, and a second drive source 46 is coupled to the second pair of supports 22 for moving the second supports laterally within the grooves. The drive sources 44 and 46 may be any of numerous suitable drive sources known to those of ordinary skill in the pertinent art, and each may include, for example, an electric motor coupled to one or both supports by a suitable drive train, such as a rack and pinion, worm gear, toothed belt and pulley, or lead screw arrangement. A manual drive system could likewise be employed, including, for example, a hand-wheel or crank coupled through a suitable drive train (not shown), such as a rack and pinion or lead screw arrangement, to the respective supports. In either case, each support may be independently driven, or each support pair may be simultaneously driven by the respective drive source.

As also shown in FIGS. 1 and 2, each of the first, second and base supports includes at least one blade-like edge formed adjacent to and defining the blade gap 18. As shown typically in FIG. 2, each of the base supports 14 and 16, and first and second supports 20 and 22, respectively, includes at least one blade bar 48 and 48' removably attached to a corner of the support forming the blade gap 18, and each blade bar defines a plurality of elongated blade-like edges 50. Each blade bar 48 extends along substantially the entire extent of the respective corner of the support, and thus defines a respective cutting edge 50 for shearing the workpiece W in cooperation with downward movement of the guillotine-like blade 30. Each blade bar 48 and 48' is removably attached to the respective support by a plurality of fasteners, shown typically at 52 in FIG. 2. Accordingly, when one of the blade-like edges 50 becomes worn, a new blade-like edge of the bar may be employed by releasing the respective fasteners 52, turning the bar on the support to present the new blade-like edge to the gap, and securing the fasteners in order to fixedly secure the bar and edge in place.

As may be recognized by those skilled in the pertinent art, each blade-like edge 50 may likewise be formed by the respective corner of the support. In this case, each support is hardened to form on its corners durable and effective blade-like edges. In addition, as shown typically in phantom lines in FIG. 2, each of the first and second supports 20 and 22, respectively, may include a plurality of blade bars 48 mounted on each of the corners of the support. In this case, each of the first and second supports may be removed, rotated, and re-mounted on the respective base support in order to present the different corners of the support, and thus the different blade bars, to the blade gap 18. Alternatively, rather than rotate the supports, the blade bars may be interchanged with one another without removing the first and second supports from the base supports. In addition, the apertures formed in each blade bar 48 for receiving the fasteners 52 may each define an elongated or other shape in order to permit a fine adjustment of the position of the blade bar on the respective support.

The workpiece W shown in FIG. 1 is in the form of a typical framing stud, defining a back wall and two parallel side walls forming a generally U-shaped cross section. Accordingly, when this type of workpiece is received within the channel 28, the back wall of the stud is seated in engagement with the third support surface 27 of the base assembly, and the two side walls of the stud are each seated in engagement with the support surfaces of the first or second supports, respectively. However, as will be recognized by those skilled in the pertinent art, the apparatus of the present invention is adaptable for use with a variety of different types of framing studs, eavestroughs and other types of workpieces. In addition, although the typical framing stud W is made of metal, the apparatus of the present invention may also be used to shear workpieces formed of other types of materials, including any of numerous different types of polymers, cardboard, paper, wood, or laminations formed of one or more of these or like materials.

In the operation of the apparatus of the present invention, a workpiece, such as the workpiece W in the form of a typical framing stud, is received within the channel 28 with its back wall seated in contact with the third support surface 27. The first supports 20 and second supports 22 are then moved inwardly toward each other until the first and second support surfaces 24 and 26, respectively, are moved into contact with the side walls of the workpiece to prevent any lateral movement of the workpiece within the channel. If necessary, and as described in further detail below with reference to the embodiments of FIGS. 6–8, the first and second supports, 20 and 22, respectively, may be adjusted laterally relative to each other to set the elongated axis of the workpiece "W" at a predetermined angle relative to the plane of the blade 30 to cut the workpiece at that angle.

The point at which the workpiece is to be cut is then placed over the blade gap 18, and the blade 30 is then driven downwardly by the drive source 38 into engagement with workpiece. The apex or lowermost point of the V-shaped cutting edge 32 of the blade first pierces the center of the back wall of the workpiece, and then as the blade is driven downwardly, the inclined cutting edge 32 of the blade cooperates with the blade-like edges 50 of the base supports 14 and 16, and first and second supports 20 and 22 to rapidly shear the stud outwardly from its centerline. Thin strips of scrap material, each having a width slightly less than that of the blade gap 18, are peeled away from the workpiece along the line of contact of the blade, and in turn fall through the portion of the blade gap between the two base supports. The illustrated V-shaped blade configuration is particularly advantageous in rapidly cutting and preventing deformation of the workpiece. Once the supports 20 and 22 are set in place, like workpieces may then be rapidly fed through the apparatus and trimmed to their desired lengths in the same manner.

In order to accommodate workpieces having a shape substantially different than that of the workpiece W of FIG. 1, it may be desirable to provide means for adjusting the angular positions of the first support surfaces 24 and/or the second support surfaces 26 relative to the third support surface 27 in order to better conform the support surfaces to the external shape of the workpiece. This may be accomplished, for example, by providing each of the first and second supports with a plurality of support surfaces oriented at different angles relative to the base support surface, as shown in FIG. 3, or by providing each of the first and second supports with adjustable support surfaces for adjusting the angular relationship of each support surface relative to the base support surface, as shown in FIG. 4.

Figure 3:
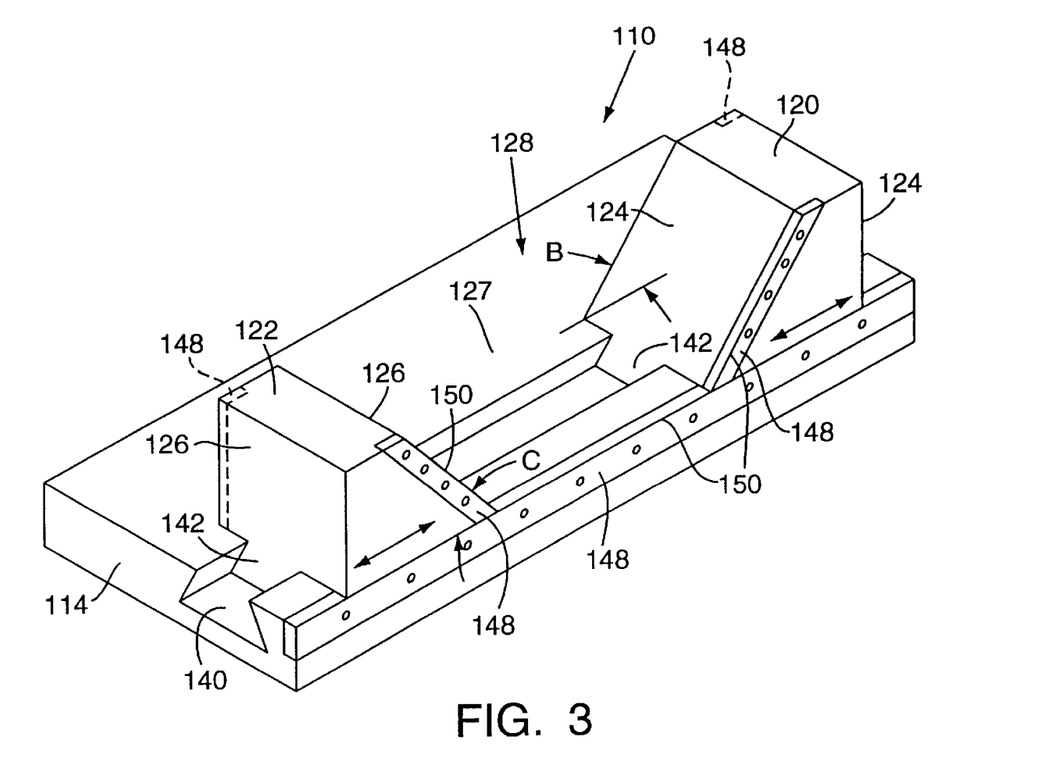
FIG. 3 is a perspective view of the typical base, first and second supports of another embodiment of an apparatus of the present invention wherein each of the first and second supports includes a plurality of support surfaces oriented at different angles relative to the base support surface for accommodating workpieces of varying configurations.

Turning first to FIG. 3, the apparatus 110 is substantially the same as the apparatus 10 described above, and therefore like reference numerals preceded by the numeral 1 are used to indicate like elements. Each of the first and second supports 120 and 122, respectively, includes four support surfaces 124 or 126 on the four vertical sides of the support, and each of the first and second support surfaces may be formed at a predetermined angle relative to the base support surface 127. As shown typically in FIG. 3, one of the first support surfaces 124 is oriented at a predetermined acute angle "B" relative to the base support surface 127, and one of the second support surfaces 126 is oriented at a predetermined acute angle "C" relative to the base support surface. The angles "B" and "C" may be equal, as shown, or each may be another angle selected to conform to the shape of a desired workpiece. Similarly, other support surfaces (not shown) may be oriented at different predetermined angles, as desired, in order to accommodate workpieces of different configurations. The first and second supports 120 and 122, respectively, may be removed and rotated on the base supports in the same manner as described above with respect to the previous embodiment in order to present each of the different support surfaces to the channel 128.

Figure 4:
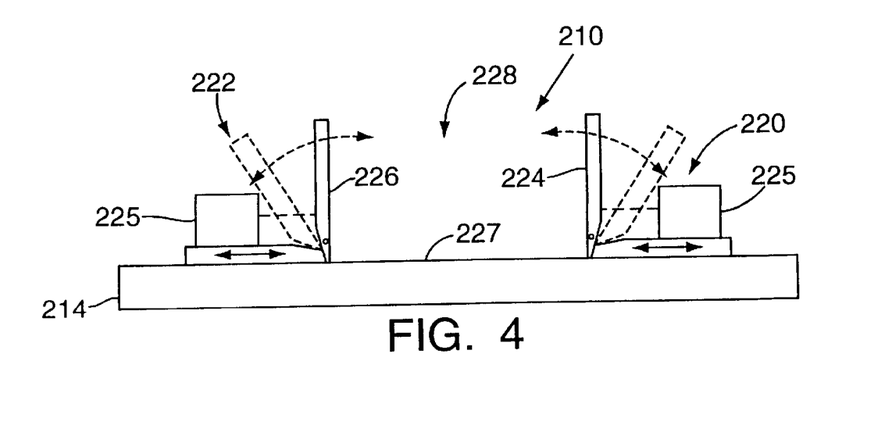
FIG. 4 is a schematic, front elevational view of another embodiment of an apparatus of the present invention wherein the first and second supports include adjustable support surfaces for adjusting the angular relationship of each support surface relative to the base support surface in order to accommodate workpieces of varying configurations.

Turning to FIG. 4, the apparatus 210 is substantially the same as the apparatus 10 described above, and therefore like reference numerals preceded by the numeral 2 are used to indicate like elements. In this embodiment, each of the first and second supports 220 and 222 includes an adjustable support surface 224 or 226 for adjusting the angular orientation of the support surface relative to the base support surface 227 in order to accommodate workpieces of varying configurations. As shown in FIG. 4, the first and second support surfaces 224 and 226 are each pivotally mounted on the respective base of the support, and an angular adjustment drive 225 is coupled to each of the first and second support surfaces for adjusting their angular positions. Accordingly, as indicated by the arrows, and the exemplary illustration in phantom lines of FIG. 4, each support surface may be pivotally adjusted on the base of the respective support in order to conform to the external configurations of a variety of different workpieces. The angular adjustment drives 225 may be any of various drive systems known to those of ordinary skill in the pertinent art, and each may include, for example, a hand-wheel or crank coupled through a suitable gear train, such as a worm gear arrangement, to the respective support surface for adjusting its angular position; or may likewise include an electric motor coupled through a like gear train to each support surface for adjusting its angular position.

Figure 5:
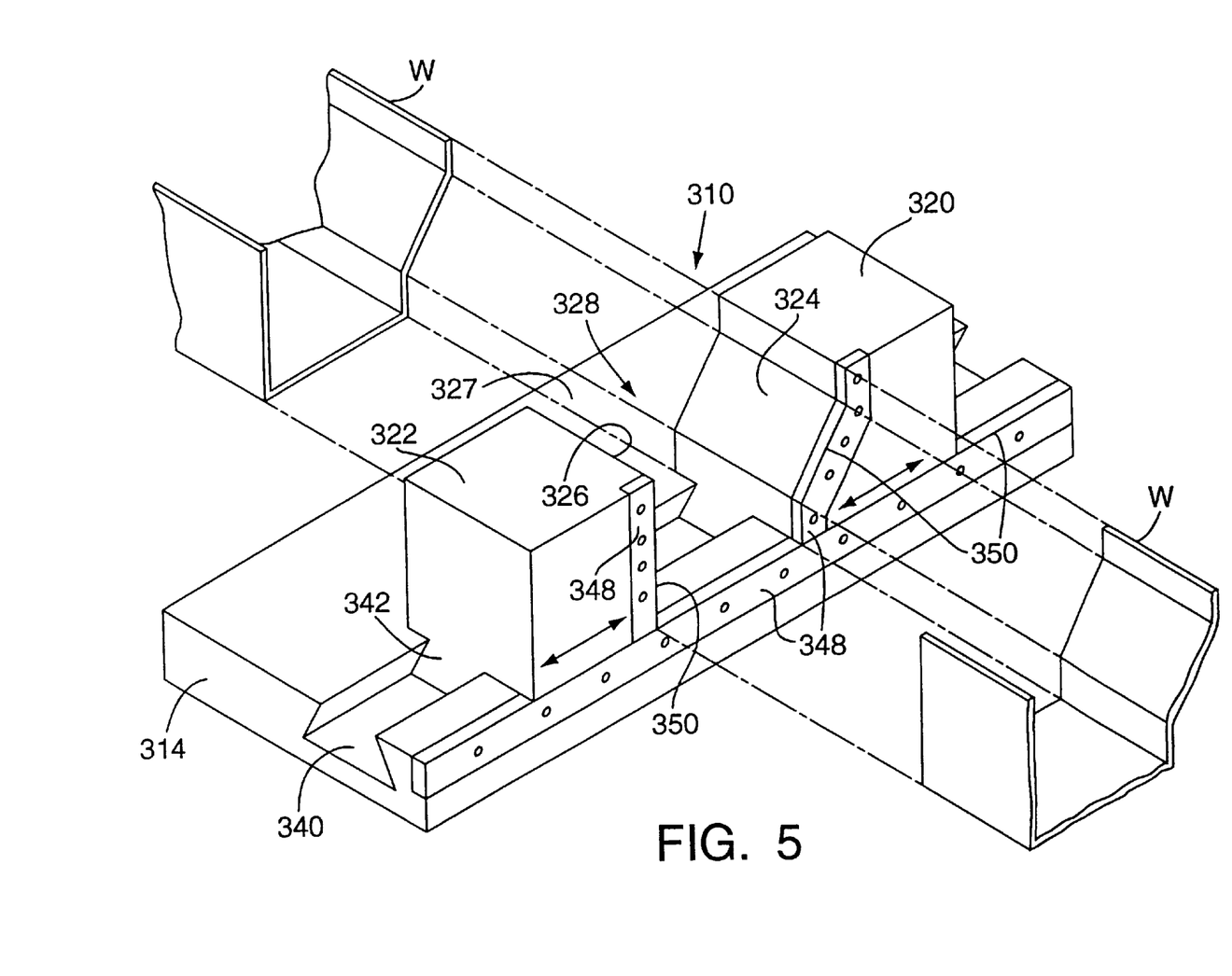
FIG. 5 is a perspective view of the typical base, first and second supports of another embodiment of an apparatus of the present invention wherein each of the first supports defines at least one non-planar support surface configuration for better conforming to the external surfaces of a workpiece.

In FIG. 5, the apparatus 310 is substantially the same as the apparatus 10 described above, and therefore like reference numerals preceded by the numeral 3 are used to indicate like elements. The primary difference of this embodiment is that at least one of the support surfaces defines a non-planar shape in order to better conform to the external configuration of a workpiece. In the example of FIG. 5, the right side of the workpiece W defines a non-planar surface configuration, and at least one of the first support surfaces 324 defines a shape substantially conforming to this non-planar shape. The respective blade bar 348 of the first support surface likewise defines a substantially-conforming shape. As will be recognized by those skilled in the pertinent art, other support surfaces may define other planar or non-planar shapes in order to approximately conform to, and thereby support other commonly-encountered workpieces.

Figure 6:
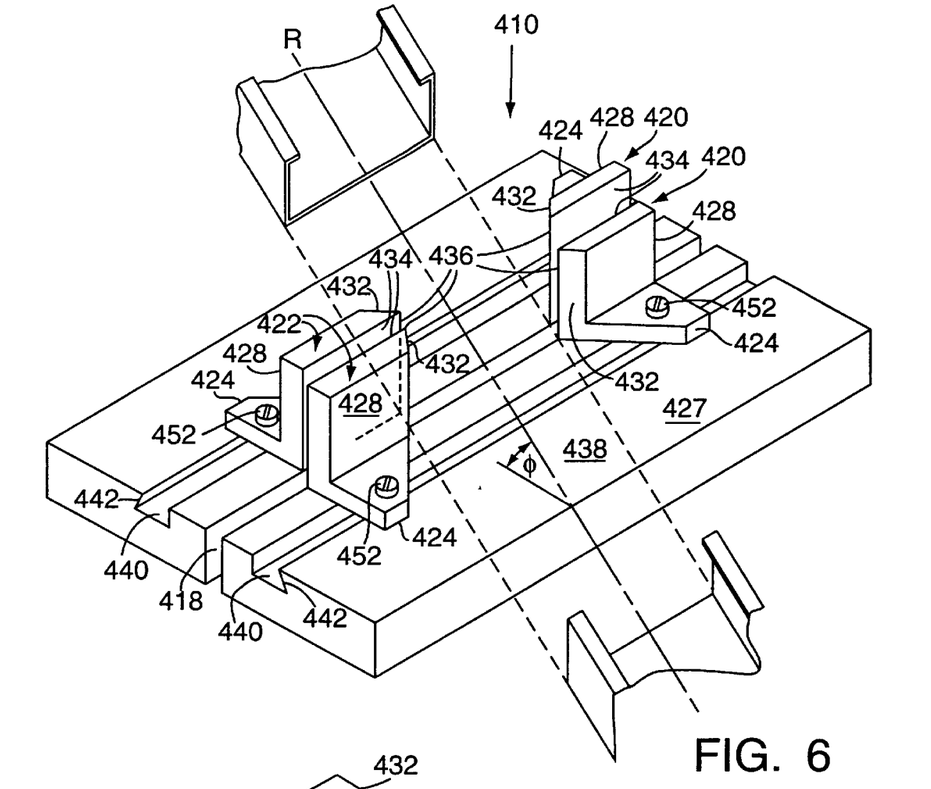
FIG. 6 is a perspective view of another embodiment of an apparatus of the present invention wherein the support surfaces are moveable relative to each other and define blade-like edges for connecting and supporting the workpiece at any desired angle relative to the plane of the blade to cut angled workpieces.

Referring to FIG. 6, the apparatus 410 is substantially the same as the apparatus 10 described above, and therefore like reference numerals preceded by the numeral 4 are used to indicate like elements. The primary difference between this embodiment and those described above is that the first and second pairs of supports, 420 and 422, respectively, each comprise a first support member 424 slidably mounted to a base support surface 427 and a second upstanding support member 428 connected to the respective first support member by at least one fastener 430, as shown typically in phantom in FIG. 7. Both the first and second support members, 424 and 428 respectively, are thin block-like members with the second support members 428 each having first and second upstanding surfaces, 432 and 434 respectively, defining blade-like edges 436 at their intersections for contacting and supporting the sides of the workpiece W. Preferably, each first upstanding surface 432 is oriented at approximately 45° relative to the respective second upstanding surface and the blade. However, as will be recognized by those skilled in the pertinent art, the first surfaces may be set at any of a variety of angles in order to accommodate a variety of workpiece shapes and configurations and to permit a predetermined range of angles to be cut.

In operation, each blade-like edge 436 engages the workpiece W along a discreet line of contact defined by the edge. Each of the supports 420 and 422 can be moved independently of, and offset relative to each other to form a channel 438 of a desired width W, and having an axis "R" oriented at a desired angle ø relative to the blade or blade gap 418. The width W, and the angle ø are each set by selectively varying the positions of the supports 420 and 422 relative to one another. The workpiece is then placed in the channel 438 and supported on its sides along the four lines of contact defined by the blade-like edges 436. With the workpiece oriented in this manner, it can be cut at the desired angle ø relative to the axis "R" of the channel and the elongated axis of the workpiece received within the channel.

Figure 7:
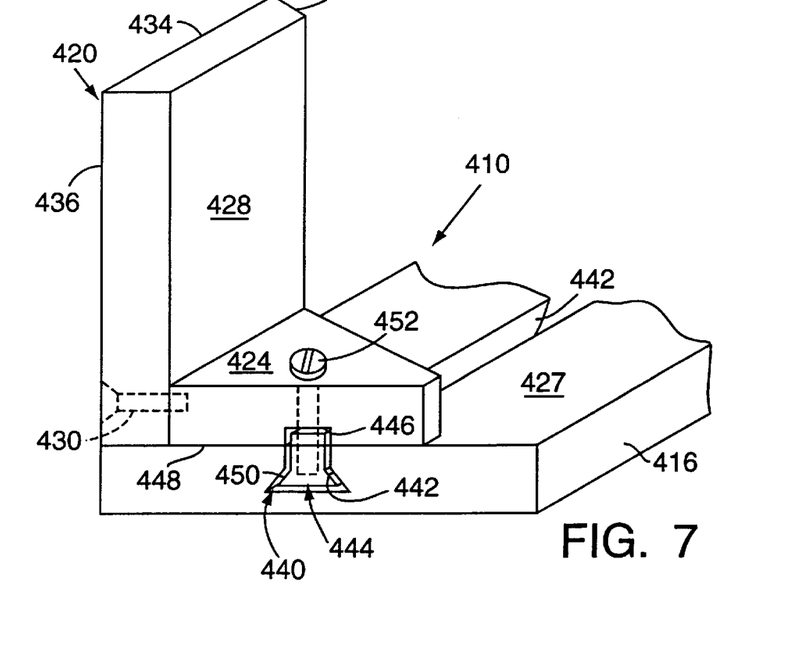
FIG. 7 is a partial, perspective view of the apparatus of FIG. 6, showing an embodiment of the supports, wherein each support is releasably secured against the base support by a dove-tail-shaped guide member.

As shown in FIGS. 6 and 7, the base support surfaces 427 define two mounting slots 440 with the blade slot 418 located therebetween and approximately parallel to the mounting slots. In the illustrated embodiment, the mounting slots 440 are each defined by dove-tail-shaped side walls 442 formed within the base support surface 418.

As shown typically in FIG. 7, four guide members 444 are received within the mounting slots 440, and each engages a respective groove 446 defined by an underside 448 of each of the first support members 424. Preferably, each of the guide members 444 defines a mating dove-tail-shaped base 450 adapted to engage the dove-tail-shaped portions 442 of the mounting slots 440. At least one fastener 452 extends through each of the first support members 424 and threadedly engages the respective guide member 444.

In operation, the supports 420 and 422 are selectively positioned along the mounting slots 440 and can be secured in place by tightening the fasteners 452 to thereby draw the mating dove-tail-shaped portions 450 of the guide members 444 against the respective dove-tail-shaped portions 442 defined by the mounting slots 440. While dove-tail-shaped portions have been shown and described, the present invention is not limited in this regard as other shaped portions, such as rectangular or circular-shaped portions, may be substituted without departing from the broader aspects of the present invention.

Figure 8:
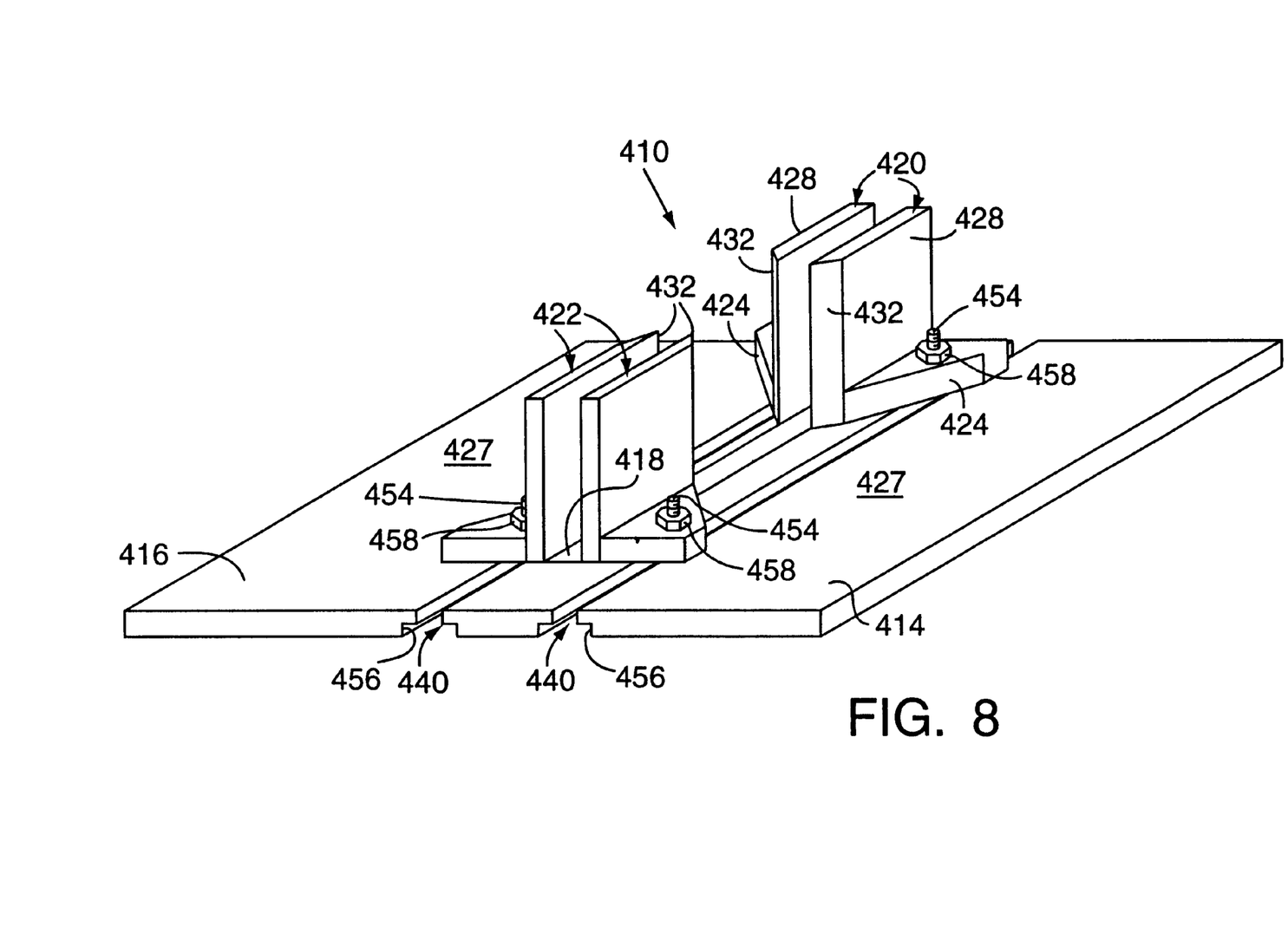
FIG. 8 is a perspective view of another embodiment of the apparatus of the present invention wherein the supports are releasably secured to the base support surfaces by fasteners, the head portion of each fastener being seated in an expanded section of a respective mounting slot defined by the base supports, and wherein a nut is threaded onto the portion of each fastener that extends above the respective support and can be selectively loosened or tightened to allow the supports to be moved or releasably secured in place.

Turning to FIG. 8, the first support members 424 are releasably secured to the base support surfaces 427 by fasteners 454 without the use of dove-tail-shaped guide members or like components, as described above. The head portion (not shown) of each fastener 454, or a washer or like component (not shown) seated between the head and the base support 426, slidably engages an expanded section 456 formed on the underside of the mounting slot 440 of the respective base support 414 or 416. A nut 458 is threaded onto the portion of each fastener 456 that extends above the first support member 424 and can be selectively loosened or tightened to allow the supports 420 and 422 to be moved or releasably secured in place.

As will be recognized by those skilled in the pertinent art, numerous changes and modifications may be made to the above-described and other embodiments of the present invention, without departing from its scope as defined in the appended claims. For example, the first and second base supports may be adjustable relative to each other in order to thereby adjust the thickness or width of the blade gap. Alternatively, the first and second base supports may be formed by a single or unitary support having an elongated slot or groove forming the blade gap. Similarly, each pair of first and second supports may be connected together, or formed as a single or unitary support, which may in turn be driven by a common drive source. The support surfaces may likewise be formed in any of numerous different shapes and/or configurations in order to better conform to, and thereby fixedly support a workpiece to effect a cutting operation as described above. The configuration of the support surfaces need not exactly conform to the configuration of the workpiece. Indeed, the particular configuration of a support surface may be selected in order to adequately support a plurality of workpieces having different configurations, but may not be identical to the configuration of any one or all of such workpieces. Accordingly, this detailed description of preferred embodiments is to be taken in an illustrative, as opposed to a limiting sense.

What is claimed is:

1. An apparatus for shearing workpieces having at least two sides formed of sheet-like material, comprising:

a first pair of supports, each defining an elongated edge for contacting and supporting a first side of a workpiece along a line defined by the edge;

a second pair of supports each defining an elongated edge for contacting and supporting a second side of a workpiece along a line defined by the edge, the second pair of supports being spaced apart from and facing the first pair of supports and defining a channel therebetween for receiving the workpiece, wherein each support is independently moveable relative to the other supports for engaging with each elongated edge the respective sides of workpieces of different widths, and for orienting and shearing a workpiece at a predetermined angle relative to an elongated axis of the workpiece;

a blade gap formed between and adjacent to the elongated edges of each of the first and the second pairs of supports; and a blade slidably received within the blade gap and movable between a first position spaced away from the workpiece received within the channel, and a second position in engagement with the workpiece for shearing the workpiece along a line of contact.

2. An apparatus as defined in claim 1, further including a base support defining a support surface extending between the elongated edges of the first and second pairs of supports and engageable with a third side of the workpiece.

3. An apparatus as defined in claim 2 wherein:

the base support defines two elongated mounting slots spaced approximately parallel to and on opposite sides of the blade gap relative to each other;

each support defines a mounting surface adapted to be slidably received in one of the mounting slots; and wherein one mounting surface from each of the first and second pairs of supports is slidably received within one of the mounting slots, and the other mounting surface from each of the first and second pairs of supports is slidably received within the other of the mounting slots.

4. An apparatus as defined in claim 1, wherein the blade includes at least one approximately planar surface defining an elongated cutting edge.

5. An apparatus as defined in claim 4, wherein the elongated cutting edge defines a generally v-shaped edge configuration.

6. An apparatus as defined by claim 1, wherein each support includes first and second upstanding surfaces forming the respective elongated edge at the intersection of the first and second surfaces.

7. An apparatus as defined by claim 6, wherein a respective one of the first and second upstanding surfaces is oriented at approximately 45° relative to the blade.

8. An apparatus as defined by claim 2, wherein each support of said first and second pairs of supports a first support portion slidably mounted on the base support surface, and a second support portion upstanding relative to the first support portion and defining the elongated edge for engaging a respective side of the workpiece.

9. An apparatus as defined by claim 8, wherein:

each of the second support portions includes upstanding first and second surfaces; and wherein the elongated edge is defined by the intersection of the first and second surfaces.

10. An apparatus as defined by claim 9, wherein at least one of the upstanding first and second surfaces defines an approximately 45° angle relative to the blade.

11. An apparatus as defined by claim 9, wherein:

the base support defines two elongated mounting slots spaced approximately parallel to, and on opposite sides of the blade gap relative to each other;

each first support portion defines a mounting surface adapted to be slidably received in one of the mounting slots; and wherein one first support portion from each of the first and second pairs of supports is slidably received within one of the mounting slots, and the other first support portion from each of the first and second pairs of supports is slidably received within the other of the mounting slots.

12. An apparatus as defined by claim 9, wherein:

the base support defines two elongated mounting slots spaced approximately parallel to and on opposite sides of the blade gap and to each other; relative, at least four guide members extend through the mounting slots, a respective one of which is coupled to each of the first support portions to guide the movement of the first support portions along the base support surface.

13. An apparatus as defined by claim 12, wherein:

the base support includes a bottom surface;

the two elongated slots each define a dove-tail-shaped portion extending from the bottom surface at least part-way through the slot; and wherein the at least four guide members each define a mating dove-tail-shaped portion adapted to be received in the dove-tail-shaped portion of the slots.

14. An apparatus defined by claim 13, wherein each guide member is coupled to a respective one of the first support portions by at least one fastener, which when tightened causes the dove-tail-shaped portion of the guide member to engage the dove-tail-shaped portion of the slot, thereby releasably fixing the position of the first support portions.

15. An apparatus as defined by claim 9, wherein the base support defines two elongated mounting slots spaced apart from and approximately parallel to the blade gap and to each other, each mounting slot defining an expanded portion extending from a bottom surface of the base support, part-way therethrough; and further including at least one fastener having a head portion slidably received in the expanded portion of a respective one of the mounting slots, and extending therethrough and into each of the first support portions; and a nut threadedly engaged with the portion of each fastener extending above the first support portion, such that when the nut is tightened the head portion of the fastener is drawn against the expanded portion of the mounting slot, releasably securing the first support portion against the base support surface.

16. An apparatus as defined in claim 1, wherein each support includes at least one support surface defining the elongated edge for contacting and supporting a respective side of a workpiece.

17. An apparatus as defined in claim 16, wherein at least one of the support surfaces is oriented at an acute angle relative to a plane of the blade for contacting and supporting a respective side of the workpiece and thereby orienting the elongated axis of the workpiece at said angle relative to the plane of the blade.

18. An apparatus as defined in claim 16, wherein at least one of the support surfaces is oriented approximately perpendicular to a plane of the blade.

19. An apparatus as defined in claim 16, wherein the at least one support surface is approximately planar.

20. An apparatus as defined in claim 1, wherein each elongated edge defines a respective blade which cooperates with the blade received within the blade gap to shear the workpiece.

21. An apparatus as defined in claim 2, wherein the base support surface extends from the elongated edges of the first pair of supports to the elongated edges of the second pair of supports to thereby define a continuous support surface extending between the first and second pairs of supports.

* * * * *